Nov. 7, 1933.                J. E. GANNON                1,933,901
                      ELECTRIC HEATING CONTROL SYSTEM
                            Filed Aug. 13, 1928
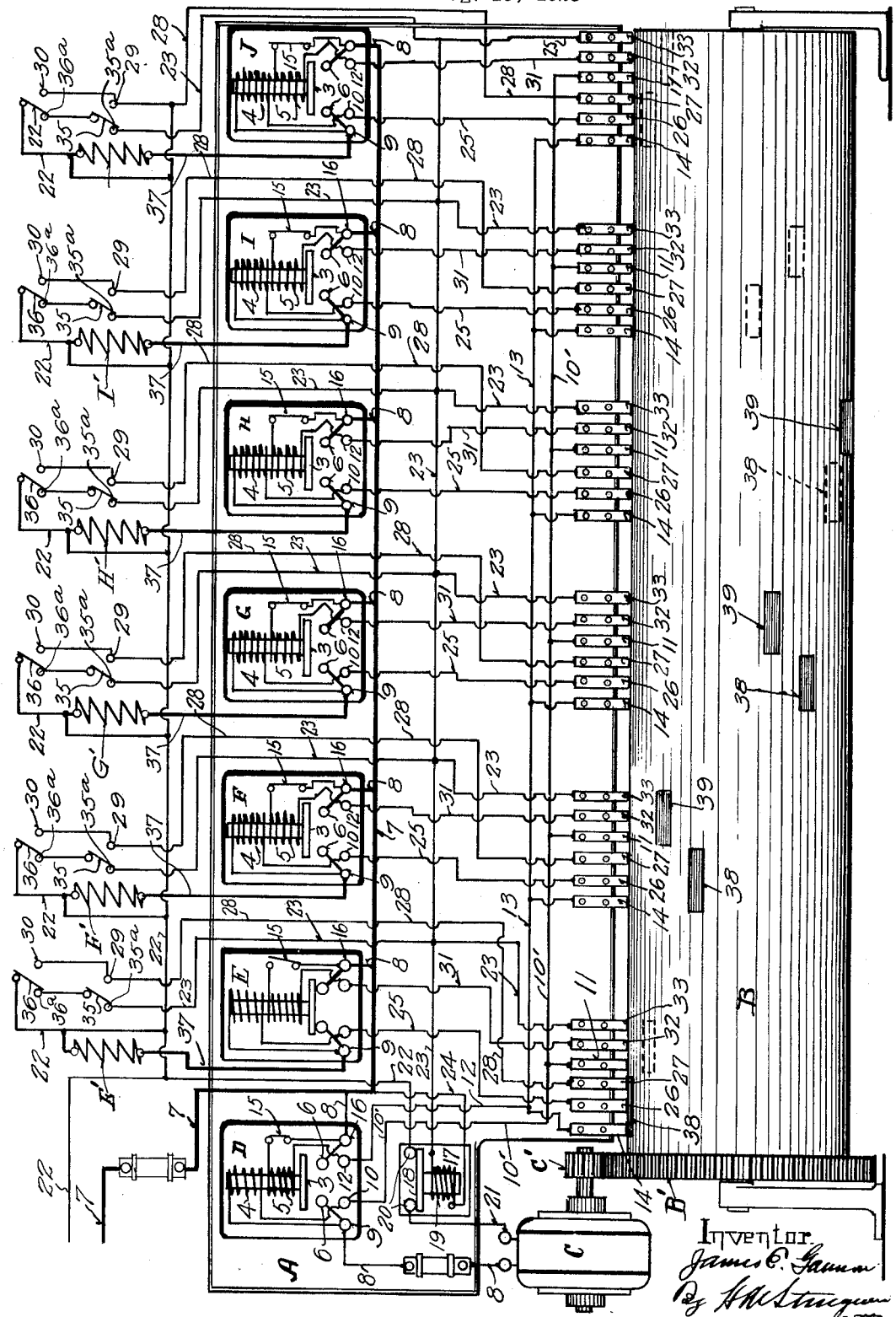

Patented Nov. 7, 1933

1,933,901

UNITED STATES PATENT OFFICE 1,933,901

ELECTRIC HEATING CONTROL SYSTEM

James E. Gannon, Erie, Pa., assignor to American Electric Heating Company, Erie, Pa., a corporation of Pennsylvania Application August 13, 1928. Serial No. 299,286

7 Claims. (Cl. 219—20)

This invention relates to electric heating control systems and method of operating the same, combining kilowatt demand and radiator control.

Radiators controlled by this system are of an especially constructed type for this purpose consisting of a heater body which is filled with water and in which are immersed an electric heating unit and a thermostat. This thermostat controls the temperature of the water—the water thermostat. A second thermostat is attached to the external part of the radiator and is located at the bottom of the radiator—the room thermostat.

These two thermostats operate a relay on the distribution panel and marked on the drawing as relay to room E, F, G, H, I, J. When any one of these relays closes it closes the circuit to the heater or heating unit E', F', G', H', I', J', for the corresponding room.

The heater brings the water up to the desired temperature in about ten minutes maximum time, that is from about 50° Fahrenheit to 190° Fahrenheit at which time the water thermostat 35 closes the opening circuit of the particular relay in operation. At the same time when the relay in operation opens the heater circuit it closes motor-relay D which in turn sets selectordrum B in motion by means of a motor C.

A contact bar on the selectordrum makes contact with the contact fingers connected to the next relay closing circuit. Simultaneously, when this relay closes, the motor-relay D opens and the selectordrum comes to rest with the contact bar under the contact fingers that are connected to the opening circuit of the relay just closed.

The same cycle as described before occurs with every opening and closing of the room relays E, F, G, H, I, J.

The contact bar which makes contact with the closing coil of a relay passes under the contact fingers and the motor-relay opens. However, the selectordrum moves a short distance—far enough for this contact bar to clear the contact fingers to the closing coil of the relay, and the drum comes to rest with the contact bar connected to the contact fingers of the opening coil.

Should any one of the room thermostats be in the off position, that is the room being up to the required temperature, and the selectordrum has closed the relay to this particular room, the relay will open the instant the contact bar comes in contact with the contact fingers of the opening circuit of this relay. The selectordrum will then move on to the next relay. If the room thermostat corresponding with this relay is also in the off position the same operation as explained before takes place and the selectordrum moves to the relay of the next room. The selectordrum comes to a complete rest at a point where heat is required in the various rooms and works the different rooms always in their respective rotation.

When all of the rooms are up to their required temperatures the auxiliary circuit through motor-relay 17 is broken and the main circuit to the motor is open but motor-relay D stays closed. As soon as any of the rooms cool enough to close the thermostat switch motor-relay 17 closes the motor circuit. The selectordrum is again in motion and closes the relay corresponding with this room.

The foregoing description and drawing show one relay operating one heater. However, we may connect two or more heaters to one relay whatever the requirements may be for the particular place to be heated. We may also connect two relays to the contact fingers and the contact bar on the selectordrum will close these two relays and open them in the same manner as described for operation with a single relay.

The object of the various combinations is to establish a definite kilowatt demand at any one time, the particular kilowatt demand required depending entirely upon the house or place to be heated. This arrangement gives power companies a definite load to figure on and establishes for them a basis to adjust and set a rate for this particular branch of their service—Home Heating.

Another feature beside those mentioned in the description and functioning of this control is the reduction in the cost of wiring installation. For instance, an installation as shown on the drawing, without control, of six heaters of three K. W. each or of a total of 18 K. W. requires a wire of at least 82 amperes capacity at 220 volts, whereas with control and only one heater working at a time a wire of 14 amperes capacity is sufficient. This applies also to the size of a mainline switch and all other materials required for an installation. The number of fuses is also cut down by this arrangement.

Then there is the combined control of the kilowatt demand and the radiators. Whatever the combination for any particular place to be heated, whether there be one or more radiators connected to work at the same time, although a certain room may be ready to be heated it will not get heat until its turn arrives. The proper number of radiators and the number of them working at the same time is, of course, an engineering problem and must be worked out for every particular job.

The relay used in connection with this control is of the regular standard type, magnetically operated and mechanically locked. It consists of an ironclad solenoid with one opening and one closing coil with mechanical locking device. The coils are only momentarily energized during the opening and closing operations. The coils of this relay (magnetic switch) are broken by an internal circuit-breaker within the relay.

The thermostats which operate the relays are also of regular standard make. The thermostatic control consists of a thermostatically operated switch which makes and breaks the main current through the magnetically operated relay.

In this invention one or more radiators constitute a heating unit which are connected to a relay, preferably of the magnetically operated and mechanically locked type.

In the specific embodiment of this invention I have chosen six heating units, comprising six radiators, as a suitable installation for the ordinary heating system of a home, it being understood that two or more radiators can be operated in unison if desired.

In this invention a separate relay is provided for each heating unit, and a separate make and break mechanism is provided for each relay, which may be continuously operated by a motor, so that make and break mechanism will operate continuously. A relay D is provided in the motor circuit to control the action of the motor.

These and other features of this invention are hereinafter described and pointed out, and are illustrated in the accompanying drawing in which:

The figure is a diagrammatic drawing of the circuits and mechanism of this invention.

In this drawing A indicates the panel, and the selectordrum is indicated by B which is provided with a spur gear B'. C indicates a motor and C' indicates a pinion on the motor shaft which meshes with the spur gear B', by which the selectordrum B is caused to rotate.

Mounted on the panel A is a motor relay D, and a series of radiator relays E, F, G, H, I, and J. These relays are identical in construction and wiring, so that a description of one is a description of all.

The relay D is mounted on the panel A, and in said relay is mounted a magnetically controlled make and break device 3, provided with a breaking coil 4, and with a making coil 5.

6—6 indicates contact posts adapted to be engaged by the make and break device 3 to complete the circuit between the contact posts 6—6 so that there will be a circuit from the main circuit 7 by way of the shunt wire 8 through the make and break device 3 to the motor.

From the circuit-breaking coil 4 one wire leads to the binding post 9 connected with the wire 8, and from the opposite end of the coil 4 a wire leads to a binding post 10 from which a wire 10' connects with the contact plate 11.

From one end of the circuit making coil 5 a wire leads to a binding post 12 from which a wire 13 is connected with the contact plate 14, and from the other end of the coil 5 a wire leads, through the mechanically operated make and break device 15 to a binding post 16 so that there is a shunt circuit from the wire 8 through the coil 5 to the contact plate 14 when the contactor 3 is closed.

The coils 4 and 5 are only momentarily energized during the opening and closing operations and the circuit is broken by an internal circuit breaker within the relay, (not shown).

17 indicates a magnetically controlled motor relay, having mounted therein a make and break device 18 and a magnetic coil 19 adapted to maintain the make and break device 18 in contact with the binding posts 20—20, from which a wire 21 leads to the motor C, and another wire 22 leads to the return wire 22.

The coil 19 is connected with a wire 23 which forms a main line circuit through one of the thermally controlled switches hereinafter described and the opposite end of the coil 19 is connected through a wire 24 with the main line 7 so that so long as the circuit is closed through any one of the thermal switches of the heater units the relay 17 closes the connection between the posts 20—20. But upon the opening of all of the thermally controlled switches the connection between the posts 20—20 is broken and the circuit through the posts 20—20 is opened.

From the binding post 10 of the relay E a shunt wire 25 is connected to the contact plate 26 and from the contact plate 27 a wire 28 leads to the binding posts 29 and 30 of the open sides of the water and room thermostats.

From the binding post 12 of the relay E a wire 31 leads to the contact plate 32, and from the contact plate 33 a wire 34 leads through the water and wall thermostats 35 and 36 to the return wire 22.

From the binding post 9 of each of the relays E, F, G, H, I and J a conductor wire 37 leads through the heating units E', F', G', H', I' and J' of a radiator, to the return wire 22.

Having thus fully described the construction and arrangement of the relays and circuits together with the operation of the circuit making and breaking cylinder, the operation of the invention is as follows:

When this electric heating system is not in use, the contact fingers 14—26—27 are connected through the contact plate 38 on the selectordrum, and the room thermostat 36 and water thermostat 35 are in cold position at 36a and 35a.

When the current is applied by closing a switch (not shown) in the line 7, a shunted circuit 24 energizes a coil 19 of the magnetic relay 17, bringing the contact bar 18 against the poles 20—20 completing the return circuit of the motor C through the wire 21.

At the same time, a radiator heating circuit is completed, beginning at the line 7, through the shunt wire 8 to binding post 16 of the radiator relay E, to contacts 6—6 connected by the bar 3, to binding post 9, and conductor 37 to the heating element E' to the return wire 22.

As soon as the water in the radiator arrives at a pre-determined temperature between 40° and 190° the water thermostat 35 breaks the contact at 35a and makes contact at 29. This forms a new circuit from line 7, through wire 8, to post 16 of relay E, through contacts 6—6 and bar 3, to post 9 through opening coil 4 to post 10, via line 25, finger 26, contact plate 38, finger 27 and wire 28 to post 29 of the water thermostat 35, through the room thermostat 36 to the return line 22. This circuit energizes the opening coil 4 and breaks the heating circuit at the poles 6—6.

At the same time the shunted circuit from line 7, passes through wire 8, post 16 of the motor relay D, and the contact breaker 15, to the closing coil 5, to binding post 12, wire 13, finger 14, bar 38, finger 27, and wire 28 to post 29 of the water thermostat 35, through room thermostat 36 to the return wire 22. This energizes the closing coil 5 thrusting the contact bar 3 down upon the poles 6—6 of the motor relay completing the motor circuit.

The motor C has a pinion C' mounted on the armature shaft that meshes with the gear B' that rotates the selectordrum B until the contact plate 39 connects the fingers 11, 32 and 33 of the next unit to be heated. When the fingers 11, 32 and 33 are connected by contact plate 39, two circuits are formed. One circuit begins at line 7 through connection 8, post 16 of the relay F, G, H, I, or J, contact breaker 15, closing coil 5, post 12, wire 31, finger 32, contact plate 39, finger 33, wire 23 to post 35a, water thermostat 35 and room thermostat 36 to return line 22. This circuit energizes the closing coil 5 and brings the contact bar 3 in connection with posts 6—6, completing a new heating circuit for F'—G'—H'—I' or J' similar to the heating circuit for E'.

At the same time a shunt circuit has been completed from line 7, through wire 8 to binding post 16 of the motor relay D, through poles 6—6 and closing bar 3 to post 9, through opening coil 4, post 10, line 10', finger 11, contact bar 39, finger 33, wire 23, thermostats 35 and 36 to line 22. This opens the motor circuit and stops the motor.

The inertia of the rotating armature of the motor C continues to rotate the selectordrum B until the contact plate 38 connects the fingers 14—26 and 27 of that unit.

The previous paragraphs describe the operation of the control mechanism from the time one radiator heat element E' begins to heat until another such heat element, as F' begins to operate. This cycle of operations will be repeated until each of the radiator spaces have been heated to the predetermined water temperature. This may be repeated a number of times until one or more of the rooms attain the desired temperature. Then the room thermostat 36 will operate and the selectordrum will pass by that heating unit on heating the radiators only when room thermostats are in contact at the cold side 36a. If all the room thermostats are open, the shunt circuit through the relay 17 is broken and the entire mechanism is dead until one or more of the room thermostats close again.

The contact making and breaking device 15 of the relays D—E—F—G—H—I and J opens the closing coil circuits while the contact bars 3 are in contact with the posts 6—6.

The circuit making and breaking device 15 of the relays D, E, F, G, H, I and J are each opened when the main circuit between the contact posts 6—6 are closed by the circuit making and breaking device 3, the mechanism for opening and closing the device 15 being common to all standard type, magnetically operated and mechanically locked relays, is not shown.

The room and water thermostats indicated diagrammatically at 35 and 36 are preferably of the type known as Federal Mercoid Thermostats designed for automatic heating equipment, and the construction and operation thereof is not shown or described as such form no part of this invention.

Having thus fully described the construction and arrangement of my invention so that others can utilize the same, I do not desire to be confined to the exact details shown and described herein as many modifications can be made therein without departing from the scope of the invention, therefore what I claim as new is:

1. In an electric heating control system, the combination of a series of heating units; an electric circuit; and a thermally responsive means controlling the circuit submitting current to the units successively and one at a time, the submission of current to a successive unit being responsive to thermal conditions arising from the energizing of a preceding unit.

2. In an electric heating control system, the combination of a series of at least three heating units; an electric circuit; and a thermally responsive means controlling the circuit submitting current to the units one at a time, the submission of current to a successive unit being responsive to thermal conditions arising from the energizing of a preceding unit.

3. In an electric heating control system, the combination of a plurality of heating units; and thermally responding means controlling the current supply to each unit, confining the current to one unit at a time comprising a motor, and a switch mechanism actuated by the motor, said switch mechanism directing the current to the units successively, the introduction of current to a successive unit being controlled by the thermal conditions arising from the energizing of a preceding unit.

4. In an electric heating system, the combination of a plurality of units; a selectordrum; a motor driving the selectordrum; an electric supply circuit; a series of switches on the selectordrum directing the current to the units successively and independently; a relay mechanism for each unit; and a thermally controlled switch at each unit acting through the relay to control the motor, said motor through the control of the relay advancing the selectordrum to interpose switches to the units successively and maintaining said current at each unit in response to the thermal requirements.

5. In an electric heating system, the combination with a plurality of burners, a switch for each burner for alternately connecting the heating element of its respective burner and the switch of a succeeding burner with a source of electrical energy, and a thermostatic control member for each burner adapted for automatically controlling its respective switch.

6. The combination of a plurality of circuits, each containing translating devices, of a source of electric current, switching mechanism associated with each of said circuits for alternately connecting the associated circuit and the switching mechanism of a succeeding circuit with said source, independent electro-magnetic means controlling each switching mechanism, and a thermostat in circuit with the electro-magnetic means and said source and controlling said electro-magnetic means.

7. The combination of a plurality of heating elements, a plurality of heat utilizing devices which are adapted for the separate heat utilizing elements and which are adapted for separate heat utilizing operations, said heating elements each having an individually operable thermostatic control, arranged so that only one heating element is in circuit at one time and so that when the thermostatic control of one of such heating elements puts it out of circuit the heating period of the next heating element is begun.

JAMES E. GANNON.